United States Patent
Fügel et al.

(10) Patent No.: US 9,745,761 B2
(45) Date of Patent: Aug. 29, 2017

(54) MAST ARM FOR A CONCRETE DISTRIBUTOR MAST AND METHOD FOR THE PRODUCTION THEREOF

(71) Applicant: Putzmeister Engineering GmbH, Aichtal (DE)

(72) Inventors: Dietmar Fügel, Wolfschlugen (DE); Karl Westermann, Walddorfhäslach (DE)

(73) Assignee: Putzmeister Engineering GmbH, Aichtal (DE)

(*) Notice: Subject to any disclaimer, the term of this patent is extended or adjusted under 35 U.S.C. 154(b) by 0 days.

(21) Appl. No.: 14/738,429

(22) Filed: Jun. 12, 2015

(65) Prior Publication Data

US 2015/0275532 A1 Oct. 1, 2015

Related U.S. Application Data

(63) Continuation of application No. PCT/EP2013/076980, filed on Dec. 17, 2013.

(30) Foreign Application Priority Data

Dec. 21, 2012 (DE) .......................... 10 2012 224 340

(51) Int. Cl.
*F16L 3/00* (2006.01)
*E04G 21/04* (2006.01)
*B23K 31/02* (2006.01)

(52) U.S. Cl.
CPC .......... *E04G 21/0445* (2013.01); *B23K 31/02* (2013.01); *E04G 21/0427* (2013.01); *E04G 21/0436* (2013.01)

(58) Field of Classification Search
CPC ............ E04G 21/0445; E04G 21/0427; E04G 21/0436; B23K 31/02
USPC .............. 248/49, 65, 903; 137/615; 141/387
See application file for complete search history.

(56) References Cited

U.S. PATENT DOCUMENTS

| 4,494,351 A | 1/1985 | Thomasson | |
| 8,881,475 B2* | 11/2014 | Lewis | E04B 5/48 248/49 |
| 2015/0197342 A1* | 7/2015 | Le Boulicaut | B64D 29/06 403/119 |

FOREIGN PATENT DOCUMENTS

| CN | 102 296 823 A | 12/2011 |
| DE | 32 31 074 A1 | 3/1983 |
| DE | 196 44 410 A1 | 4/1998 |
| EP | 1 775 390 A1 | 4/2007 |
| FR | 2 816 970 A1 | 5/2002 |

(Continued)

OTHER PUBLICATIONS

English Translation of International Preliminary Report on Patentability and Written Opinion of the International Searching Authority, PCT/EP2013/076980, Jun. 23, 2015.

*Primary Examiner* — Gwendolyn Baxter
(74) *Attorney, Agent, or Firm* — Bose McKinney & Evans LLP

(57) ABSTRACT

A mast arm for a concrete distributor mast comprises an elongated box profile support composed, in at least some sections, of a lower belt, an upper belt, and two lateral walls that connect the belts, and comprising at least one partition sheet metal element arranged in a hollow cross-section of the box profile support, the partition sheet metal element being welded to the box profile support along longitudinal welding joints running along the box profile support.

18 Claims, 2 Drawing Sheets

(56) References Cited

FOREIGN PATENT DOCUMENTS

| JP | H 11-200397 | 7/1999 |
|---|---|---|
| WO | WO 2006/097827 A2 | 9/2006 |

\* cited by examiner

MAST ARM FOR A CONCRETE DISTRIBUTOR MAST AND METHOD FOR THE PRODUCTION THEREOF

RELATED APPLICATIONS

This application is a continuation of PCT/EP2013/076980, filed Dec. 17, 2013, which claims priority to DE 10 2012 224 340.2, filed Dec. 21, 2012, both of which are hereby incorporated herein by reference in their entireties.

BACKGROUND

The invention relates to a mast arm for a concrete distributor mast, comprising an elongated box profile support composed, in at least some sections, of a lower wall, an upper wall, and two lateral walls that connect the walls, and comprising at least one partition sheet metal element arranged in a hollow cross section of the rectangular-shaped closed box profile support. The invention further relates to a method for the production of one such mast arm.

DE 196 44 410 A1 discloses a concrete distributor mast as a support for a concrete delivery pipe with several mast arms connected for articulation and having a closed box-shaped profile. It is thereby proposed that the mast arms have a box profile, and that at least one mast arm contains a reinforcing partition wall which runs transversely through the interior chamber. There is nothing further about the fixing or assembly of the sheet metal partition wall from this printed specification.

SUMMARY

This disclosure further improves the products and methods known from the prior art and provides a stress-resistant construction of a mast arm which can be produced simply and with precision, particularly for a concrete distributor mast.

This disclosure stems from the idea of preventing the notch effect through transverse welding joints. It is accordingly proposed according to this disclosure that the partition sheet metal element is welded to the box profile support by way of longitudinal welding joints which run along the box profile support in the direction of its longitudinal axis. A technically favorable welding process can thereby be ensured and the stiffening action of a sheet metal partition plate utilized without welding joints which run transversely to the stress direction of the arm acting on the arm like notches. Even with reduced sheet metal thicknesses the load capacity or bearing strength and the torsional rigidity of the arm can thus also be clearly increased.

An advantageous design proposes that the longitudinal welding joints run in the connection area between the upper and lower walls and the lateral walls in the direction of the longitudinal axis so that joining them together becomes easier.

The longitudinally aligned bonded welding joint can be simplified in that the partition sheet metal element is formed from a flat partition sheet metal plate with welding lugs protruding at the edges, and that the longitudinal welding joints are each attached to a welding lug.

In order to provide a fixed connection it is advantageous if the welding lugs are each welded to an edge section of the partition sheet metal plate, preferably on both sides.

A further improvement can be achieved in that the partition sheet metal plate preferably has corner parts which engage by diagonal stays into the corner regions of the box profile support, and that a welding lug is arranged on each corner part.

Also from a structural point of view it is an advantage if the preferably T-shaped designed welding lugs have a connecting web which protrudes on both sides over the partition sheet metal plate for the purpose of welding with the box profile support, and if the welding lugs have a base surface which bears with a flat surface area against the upper and lower walls or the lateral walls.

A design which is particularly advantageous from the technical production point of view is one in which the upper and lower walls or the lateral walls are provided with cutouts for introducing the longitudinal welding joints as a fill layer. The fill layer thereby fills up the relevant cutout at least in some areas.

It is also favorable if each upper and lower wall and one lateral wall are welded to one another in a connecting area by a cap joint which covers the longitudinal welding joint. The cap joint thereby stands in direct or material-bonding contact with the longitudinal welding joint. The longitudinal welding joints can thereby coincide with the support welding joints which are normally present in any case and which connect the upper and lower walls and the lateral walls.

It is advantageous particularly for a space-saving and at the same time highly stable arm structure if the box profile support is bent in at least one crank portion, and if the crank portion is reinforced by a partition sheet metal element.

This disclosure also provides a distributor mast with several mast arms connected to one another for articulation for holding a concrete delivery pipe wherein at least one mast arm is reinforced with a partition sheet metal element according to this disclosure. The partition sheet metal element is welded to the box profile support by way of longitudinal welding joints which run along the box profile support.

A further advantageous measure consists in prefabricating the partition sheet metal element from a flat partition sheet metal plate and welding lugs attached along the edges thereof, and then fixing it in the box profile support in the connecting region between the walls and lateral walls by way of a longitudinal welding joint at the welding lugs.

It is also advantageous from the technical production point of view if the upper and lower walls or the lateral walls are provided with cutouts, and if a longitudinal welding joint is introduced as a fill joint in each of the cutouts. The longitudinal welding joints can thereby be covered by a cap joint for connecting a lateral wall to one of the upper and lower walls.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

In this disclosure, terms such as "vertical," "parallel," "horizontal," "right angle," "rectangular" and the like are used to describe the orientation, position or general shape of structural elements disclosed herein. As would be readily recognized by one of ordinary skill, it shall be understood for purposes of this disclosure and claims that these terms are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein.

Figure 1:
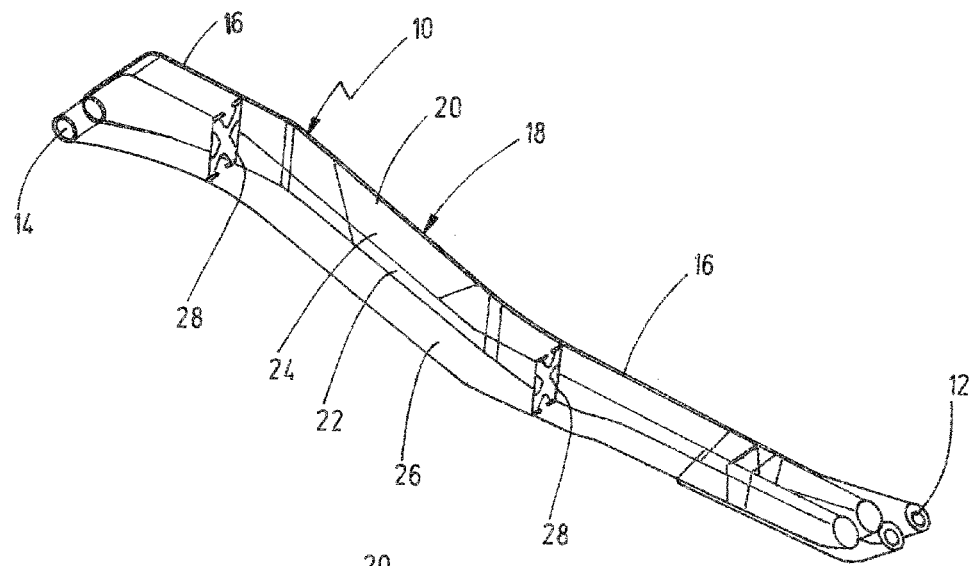
FIG. 1 shows a mast arm for a concrete distributor mast with a built-in partition sheet metal plate in a transparent perspective illustration.

The mast arm 10 illustrated in FIG. 1 can be connected with articulation via articulated ends 12, 14 to further mast arms as an articulated mast for guiding a concrete delivery pipe, wherein laterally angled arm regions 16 (also referred to herein as "crank portions") enable the arm packet to be folded in in a space-saving manner. The mast arm 10 has a box profile support 18 which is elongated along a longitudinal axis and which is comprised of an upper belt 20, a lower belt 22, and two lateral walls 24, 26 forming a rectangular cross section. Partition sheet metal elements 28 are arranged in the angled regions 16 for reinforcement in the hollow cross section of the box profile support 18 which is illustrated in transparent form.

Figure 2:
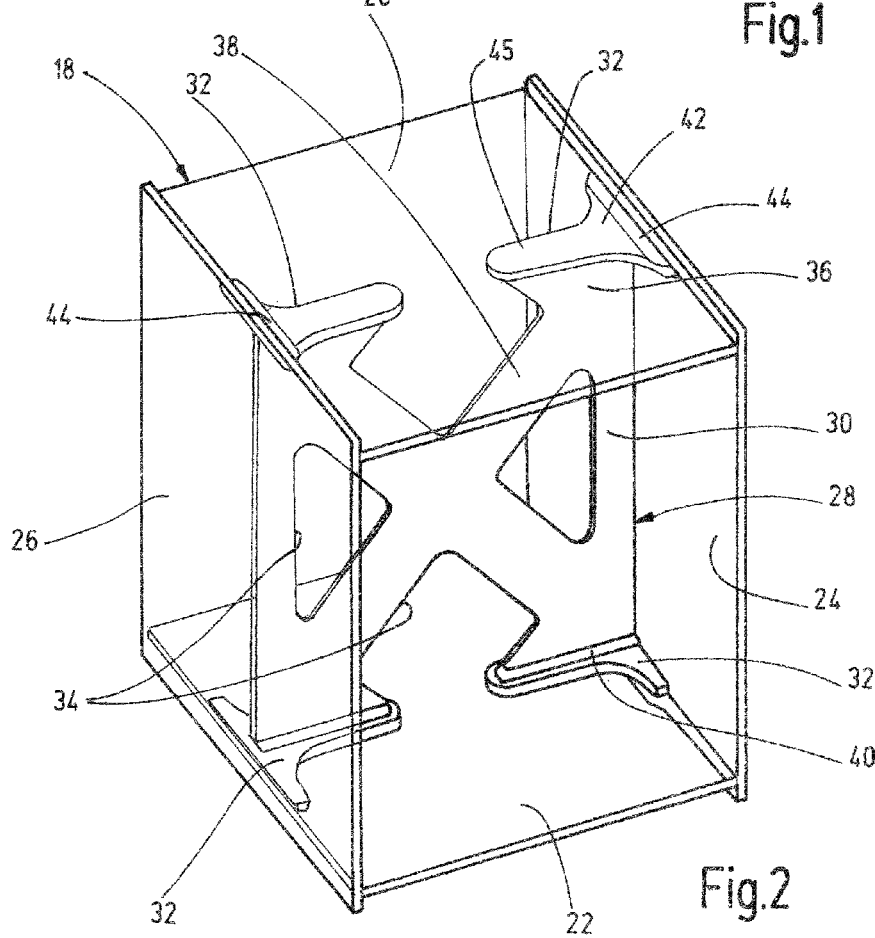
FIG. 2 is an enlarged sectional view of a partition sheet metal plate portion of the mast arm of FIG. 1.

As can best be seen from FIG. 2 each partition sheet metal element 28 consists of a basic-shaped rectangular flat partition plate 30, and four welding lugs 32 protruding at the edges in the corner regions.

In order to save weight the partition sheet metal plate 30 is provided with recesses 34 wherein the corner parts 36 which are provided with welding lugs 32 remain connected by way of diagonal stays 38 so that parallelogram displacements of the box profile support 18 are prevented.

The T-shaped welding lugs 32 are fixedly connected at their base arm to an edge section of the sheet metal plate 30 by way of a peripheral welding joint 40. The connecting web 42 of the welding lugs 32 protruding each side crosswise at the partition plate 30 enables welding with the box profile support 18 via a longitudinal welding joint 44 which runs in the direction of the support longitudinal axis, as will be explained in further detail below. The longitudinal welding joints 44 are thereby each located in the connection region between a wall 20, 22 and a lateral wall 24, 26. In the installed position the welding lugs 32 lie with their free base surface 45 flat against the walls 20, 22.

Figure 3:
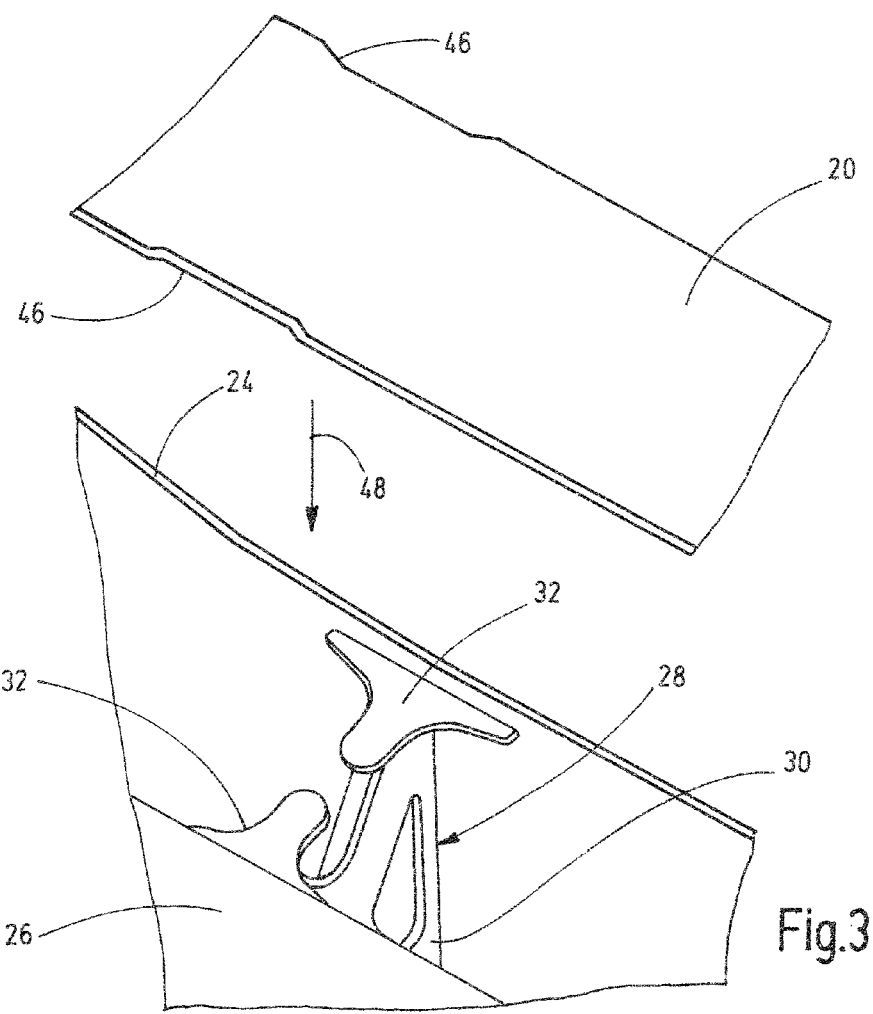
FIG. 3 is a perspective partial view of the partition sheet metal plate portion when attaching the upper wall.

The production and assembly of the box profile support 18 will be explained below with reference to FIGS. 3 and 4. The partition sheet metal elements 28 are prefabricated separately in that the partition plate 30 is cut out from a flat iron material and then the welding lugs 32 are welded on. In a further method step the walls 20, 22 are provided on the edges with cutouts 46 for introducing the longitudinal welding joints 44. With the end production of the box profile support 18 first the lower wall 22 and the two lateral walls 24, 26 are welded to one another and to the positioned partition sheet metal elements 28, wherein the partition sheet metal elements 28 can also ensure an improved dimensional stability during assembly. The upper wall 20 is then placed and fixed in the direction of the arrow 48.

Figure 4:
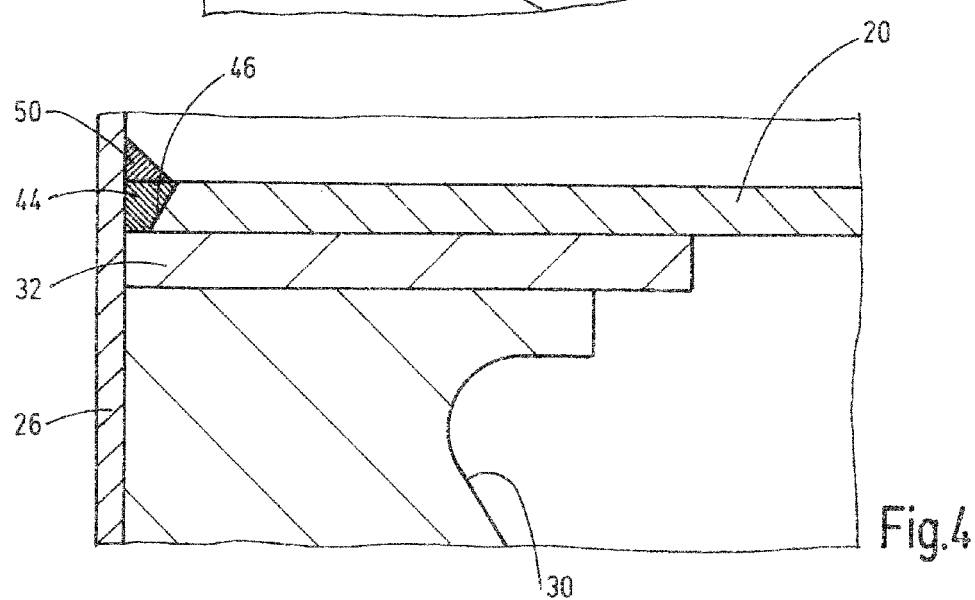
FIG. 4 is a cross sectional view of a section of the mast arm in the region of a built-in partition sheet metal plate.

The respective longitudinal welding joint 44 is introduced from outside as a fill joint into the belt cutout 46 in the region of the welding lugs 32 (FIG. 4). The welding connection of the lateral walls 24, 26 to the upper belt 20 is then carried out via connecting joints 50 (also referred to herein as "cap joints"—see ¶ [0012]) which run in the edge region along a marginal overhang of the lateral walls 24, 26 above the upper belt 20, and cover the longitudinal welding joints 44 in the region of the cutouts 46. It is evident that the welding joints 44, 50 are also attached correspondingly on the lower belt 22. Thus for assembly no welding work is necessary inside the box profile support 18. Furthermore notch effects as a result of transverse welding joints are avoided.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A mast arm for a concrete distributor mast, the mast arm comprising:
    an elongated box profile support having, in at least some sections, a lower wall, an upper wall and two lateral walls which connect the lower and upper walls, the box profile support having a hollow cross section when closed; and
    a partition sheet metal element arranged in the hollow cross section of the closed box profile support, wherein the partition sheet metal element is welded to the box profile support by longitudinal welding joints extending along the box profile support, whereby notch effects transverse to the stress direction of the mast arm can be prevented.

2. The mast arm as claimed in claim 1, wherein the longitudinal welding joints are located in connection regions between the upper and lower walls and the lateral walls and the longitudinal welding joints extend in the direction of a longitudinal axis of the box profile support.

3. The mast arm as claimed in claim 1, wherein:
    the partition sheet metal element is formed from a flat partition sheet metal plate with welding lugs protruding from edges of the flat partition sheet metal plate; and
    the longitudinal welding joints are each attached on a respective welding lug.

4. The mast arm as claimed in claim 3, wherein the welding lugs are each welded on an edge portion of the partition sheet metal plate.

5. The mast arm as claimed in claim 3, wherein the partition sheet metal plate has corner parts engaging into corner regions of the box profile support and one of the welding lugs is arranged on each corner part.

6. The mast arm as claimed in claim 3, wherein the welding lugs are T-shaped and have a connecting web protruding over the partition sheet metal plate for welding to the box profile support.

7. The mast arm as claimed in claim 3, wherein the welding lugs have a base surface which bears flat against the upper, lower or lateral walls.

8. The mast arm as claimed in claim 1, wherein the upper, lower or lateral walls are provided with cutouts for introducing the longitudinal welding joints.

9. The mast arm as claimed in claim 1, wherein the upper and lower walls are welded to respective lateral walls in connection regions by cap joints, the cap joints covering the longitudinal welding joints.

10. The mast arm as claimed in claim 1, wherein the box profile support is bent in at least one crank portion and the crank portion is reinforced by a partition sheet metal element.

11. A distributor mast for holding a concrete delivery pipe, comprising at least one mast arm formed according to claim 1.

12. A method for producing a mast arm for a concrete distributor mast, comprising:
providing a partition sheet metal element;
connecting together a lower wall, an upper wall and two lateral walls to form a rectangular closed elongated box profile support, the closed box profile support enclosing the partition sheet metal element in a hollow cross section of the box profile support; and
welding the partition sheet metal element to the box profile support via longitudinal welding joints which run along the box profile support, whereby notch effects transverse to the stress direction of the mast arm can be prevented.

13. The method as claimed in claim 12, further comprising prefabricating the partition sheet metal element from a flat partition sheet metal plate with welding lugs attached to the edges thereof.

14. The method as claimed in claim 13, wherein the longitudinal welding joints are applied at the welding lugs in a connecting region between the upper and lower walls and lateral walls.

15. The method as claimed in claim 13, wherein the upper and lower walls or the lateral walls are provided with cutouts and the method comprises introducing the longitudinal welding joints as fill joints into the cutouts.

16. The method as claimed in claim 12, wherein the longitudinal welding joints are covered by cap joints to connect the lateral walls to the respective upper and lower walls.

17. The method as claimed in claim 12, wherein the step of welding the partition sheet metal element to the box profile support is done after the partition sheet metal element is enclosed by the box profile support.

18. A mast arm for a concrete distributor mast, the mast arm comprising:
an elongated box profile support having, in at least some sections, a lower wall, an upper wall and two lateral walls which connect the lower and upper walls, the box profile support having a hollow cross section when closed; and
a partition sheet metal element arranged in the hollow cross section transversely to a longitudinal direction of the box profile support, wherein the partition sheet metal element is welded to the box profile support by welding joints extending along the longitudinal direction, whereby notch effects transverse to the stress direction of the mast arm can be prevented.

* * * * *